Jan. 15, 1963 H. G. DE FRANCE 3,073,894

CHROMINANCE SUBCARRIER PHASE INVERTER

Filed May 6, 1959

United States Patent Office 3,073,894

Patented Jan. 15, 1963

3,073,894

CHROMINANCE SUBCARRIER PHASE INVERTER

Henri Georges de France, Paris, France, assignor to Compagnie Francaise de Television, a corporation of France Filed May 6, 1959, Ser. No. 811,443
Claims priority, application France May 9, 1958
7 Claims. (Cl. 178—5.4)

Figure 1:
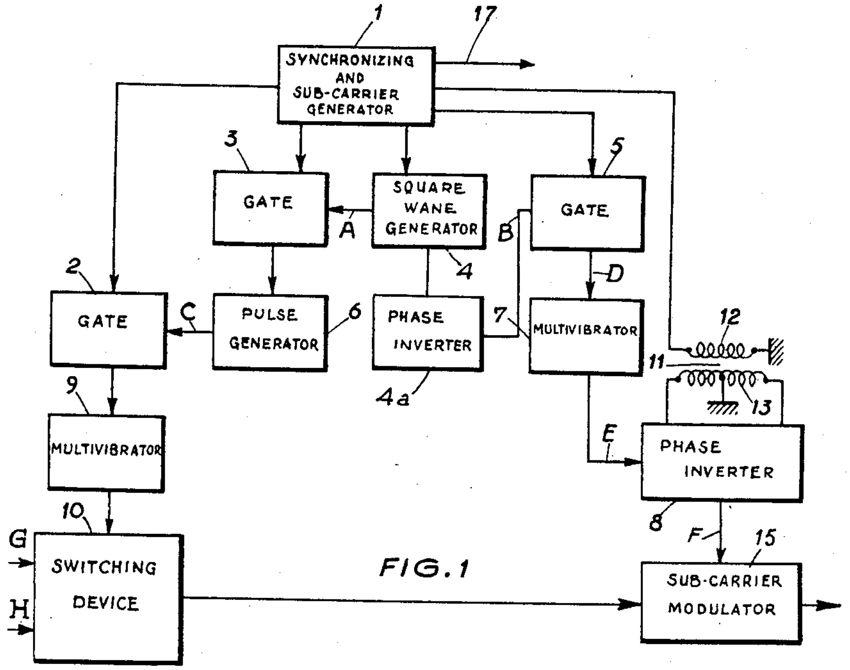

The present invention relates to compatible color television systems. More particularly it relates to a system as described in the co-pending patent application Serial No. 660,957, filed by the applicant on May 22, 1957, for "Color Television Systems," now U.S. Patent 2,993,086, granted July 18, 1961.

According to the above system, luminance information is never transmitted together with the whole of the chrominance information. Instead of that it is transmitted simultaneously with only one of the two chrominance signals which are necessary for providing a color picture signal. Thus, the chrominance information is transmitted with alternate signals, while luminance information is permanently and integrally transmitted. Luminance information occupies a frequency band which is much larger than that allocated to chrominance information.

The alternation period of the chrominance signals corresponds to the line frequency period or a low multiple thereof.

In the above mentioned known system, the subcarrier frequency, if amplitude or phase modulated, is preferably selected equal to an uneven multiple of half the line scanning frequency (see for example "Frequency Interlace Color Television," by R. Dome, Electronics, September 1950, page 70).

At the receiver, memory means are provided for storing the chrominance signal during the periods where it is transmitted and restituting it during the alternate periods where it is not transmitted, thus making the whole of the information continuously available.

The chrominance signals are transmitted, within a small fraction of the frequency band used for the transmission and modulate a subcarrier wave, selected at the upper end of this band.

Certain drawbacks become apparent in the above system. Thus, on account of the fact that the chrominance subcarrier is alternately modulated by two chrominance signals which alternate at the line frequency, the recurrence frequency of the chrominance signals is half that of the luminance signal. This results in an interlace which, instead of being twofold, is fourfold with consequent crawling upward or downward of the field, according to whether the number of scanning lines is a multiple of four plus or minus one.

When chrominance information is permanently restored by means of a memory system, intermodulation between the two component signals remains comparatively low and the fourfold interlacing has no disturbing effect. However, during black and white reception, the reception, the presence of the chrominance subcarrier which is not demodulated and is superposed on the luminance signal, may introduce disturbing effects which appear on the reception screen and are only partially compensated by the spatial and temporal integration of opposite effects.

It is an object of the invention to avoid these drawbacks, thus improving the system described in the above mentioned copending patent application.

To this end means are provided for periodically changing the alternation order of the two partial chrominance signals at the beginning of each field only during equal sequences comprising an even number of fields, said sequences being separated by intervals comprising the same said number of fields. For example, this order is changed at the beginning of each field period during four fields; then this order remains unaltered during the four succeeding fields.

In addition, the phase of the chrominance subcarrier is shifted by 180°, at the beginning of each field during such intervals. Thus the invention provides a television system wherein luminance signals are continuously transmitted together with one of the two chrominance signals, which are alternately transmitted, the alternation frequency being the same as the line frequency, said system comprising means for reversing the alternation order of said chrominance signals at the beginning of each field only during equal sequences comprising an even number of fields separated by intervals comprising the same number of fields and for reversing the phase of the chrominance subcarrier at the beginning of each field during said intervals. By the expression "at the beginning of a field," is meant "during the field blanking time interval which precedes the visible portion of each field."

Figure 2:
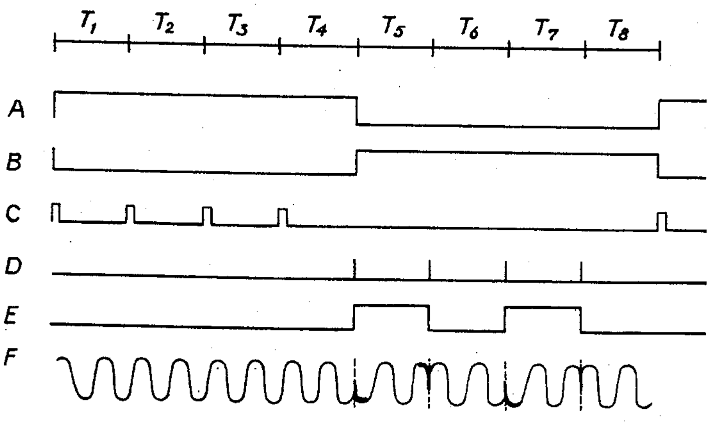

The invention will be best understood from the following description and appended drawings, given solely by way of example and wherein:

FIG. 1 is a block diagram of an embodiment of a device according to the invention; and FIG. 2 is a diagram of the signals at the main points of FIG. 1.

According to the embodiment illustrated in FIG. 1, a generator 1 provides horizontal and vertical blanking pulses, synchronizing pulses and the subcarrier wave. It has its outputs connected to a gate 2 to which it feeds the horizontal blanking pulses, to gates 3 and 5, to which it feeds vertical blanking pulses, and to a circuit assembly including a square wave generator 4 with a frequency equal to ⅛ of the field frequency (as will be seen from FIG. 2), which is also fed with the vertical blanking pulses. Generator 1 also feeds with the subcarrier wave the primary winding 12 of a transformer 11, the secondary winding 13 of which has its mid-point grounded. The synchronizing signals are collected at an output 17 of generator 1. The square wave generator 4 feeds, through an output A, gate 3 and is connected, through a phase shifter 4a and through the output B of the same, to gate 5. Gates 3 and 5 have their outputs coupled to a pulse generator 6 and to a multivibrator 7, respectively. Gate 2 has its second input connected to generator 6. The output of gate 2 is connected to a multivibrator 9 which controls a switching device 10. The latter applies to a modulator 15 the chrominance signals G and H according to its position which is determined by multivibrator 9. Multivibrator 7 is connected to a subcarrier phase inverter 8 which is fed by the secondary winding 13 of transformer 11 and provides at its output F the subcarrier wave which is modulated in modulator 15.

The operation of the circuit shown in FIG. 1 will be described with particular reference to FIG. 2, illustrating the signals at the main points of this circuit, the same letters being used to designate the signals in FIG. 2 and the points where they appear in FIG. 1. The time scale is indicated in the upper portion of FIG. 2 in terms of successive fields $T_1$, $T_2$ . . . $T_8$.

The square wave generator 4 feeds to gate 3 the signals shown at A in FIG. 2, thus allowing the field blanking signals to pass during four fields and stopping them during the four succeeding fields. Due to the action of the phase shifter 4a, signals B fed by this assembly to gate 5 are in phase opposition with signal A and accordingly the operation of gate 5 is opposite to that of gate 3. The blanking pulses from gate 3 trigger into action the pulse generator 6 which emits a pulse C at the beginning of the four succeeding fields, for each incoming blanking pulse $T_1$ to $T_4$, and stops during the four next fields. The pulses thus generated by generator 6 are fed to gate 2 which remains closed during the reception of these pulses. The duration of each signal C is such that an odd number of line blanking pulses is prevented from passing through gate 2 each time a pulse C is applied to the latter. The signals delivered by gate 2 trip the bistable multivibrator 9. This multivibrator controls switch 10 and according to whether multivibrator 9 is in one or in the other of its two stable conditions, the first or the second chrominance signal is applied to subcarrier modulator 15 to modulate the subcarrier.

Since the number of blanking signals which are not allowed to pass through gate 2, each time a pulse C is applied to this gate, is uneven, the phase of the signals issuing from multivibrator 9 is changed each time gate 2 is blocked, thus reversing the sequential order of the two chrominance components.

Due to the phase opposition between signals A and B shown in FIG. 2, gate 5 allows blanking signal D to pass when gate 3 does not and conversely. Multivibrator 7 is tripped by signal D, thus providing signals E which control the operation of a phase inverter device 8, which inverts the phase of subcarrier each time multivibrator 7 is tripped. Thus, the subcarrier has a phase of a given sign during fields 5 and 7 and a phase of opposite sign during fields 6 and 8. The subcarrier is alternately modulated by the two chrominance signals in modulator 15, as already mentioned.

Experience shows that, under these conditions, the mobile structures, which would otherwise provide a crawling effect on the receiving screen, compensate each other and the subcarrier does no longer cause any disturbing effect.

It is to be understood that the invention is in no way limited to the embodiment described and illustrated which was given solely by way of example.

What is claimed is:

1. A color television system comprising: generator means for generating a subcarrier wave, line frequency signals and field frequency signals; means for simultaneously transmitting a luminance signal and one of two chrominance component signals, said transmitting means comprising a switching system for alternating at said line frequency said chrominance signals and means for modulating thereby said subcarrier wave; first circuit means between said generator means and said switching system, for reversing the operation of said switching system at the beginning of each of the field periods belonging to equal sequences comprising a predetermined even number of succeeding field periods, said sequences being separated by intervals comprising the same said number of succeeding field periods; and a second circuit means, controlled by said generator means for operating as a function of said field frequency, for reversing the phase of said subcarrier wave at the beginning of each of the field periods belonging to said intervals.

2. A system according to claim 1, wherein said line and field frequency signals are line blanking and field blanking signals.

3. A color television system comprising: generator means for generating a subcarrier wave, line frequency signals and field frequency signals; means for simultaneously transmitting a luminance signal and one of two chrominance component signals, said transmitting means comprising a switching system for alternating at said line frequency said chrominance signals and means for modulating thereby said subcarrier wave; first circuit means between said generator means and said switching system for reversing the operation of said switching system at the beginning of each of the field periods belonging to sequences comprising a predetermined even number of field periods, said sequences being separated by intervals comprising the same said number of succeeding field periods; second circuit means, controlled by said generator means for operating as a function of said field frequency, for reversing the phase of said subcarrier wave at the beginning of each of the field periods belonging to said intervals and means connected between said first and second circuit, for rendering said first circuit operative only during said sequences and said second circuit operative only during said intervals.

4. A color television system comprising: generator means for generating a subcarrier wave, line frequency signals and field frequency signals; means for simultaneously transmitting luminance signals and one of two chrominance component signals, said transmitting means comprising a switching system for alternating at said line frequency said chrominance signals and modulator means for modulating thereby said subcarrier wave; a square wave generator controlled by said field frequency signals having a period equal to $2n$ times said field period, $n$ being an even integer, a first gate, for gating said field frequency signals, said first gate being alternately blocked and unblocked for $n$ consecutive field periods by said square wave generator; a pulse generator controlled by the output signals of said first gate to emit at said field frequency pulses, the duration of which is equal to an odd number of said line periods, when said first gate is unblocked; a second gate, for gating said line frequency signals, said second gate being controlled by said pulse generator and being blocked when said pulses are emitted by said pulse generator; a multivibrator switch controlled by said line frequency signals through said second gate for selectively feeding one of said two chrominance signals to said subcarrier modulator; a third gate, for gating said field frequency signals, said third gate being controlled by said square wave generator in such a way that said third gate is blocked when said first gate is unblocked and conversely; a phase inverter for inverting the phase of said subcarrier wave; and a multivibrator pulse generator for controlling said phase inverter, said multivibrator pulse generator being controlled by said field frequency signals through said third gate.

5. In a color television system comprising generator means for generating a subcarrier wave, line frequency signals and field frequency signals and means for simultaneously transmitting luminance signals and one of two chrominance component signals, said transmitting means comprising a switching system for alternating at said line frequency said chrominance signals and a subcarrier wave modulator for modulating thereby said subcarrier wave; a square wave generator controlled by said field frequency signals having a period equal to $2n$ times said field period, $n$ being an even integer; a first gate, for gating said field frequency signals, said first gate being alternately blocked and unblocked for $n$ consecutive field periods by said square wave generator; a pulse generator controlled by the output signals of said first gate to emit at said field frequency pulses, the duration of which is equal to an uneven number of said line periods, when said first gate is unblocked; a second gate for gating said line frequency signals, said second gate being controlled by said pulse generator and being blocked when said pulses are emitted by said pulse generator; and a multivibrator switch controlled by said generator means line frequency signals through said second gate for selectively feeding one of said two chrominance signals to said subcarrier modulator.

6. In a color television system comprising generator means for generating a subcarrier wave and field frequency signals and means for simultaneously transmitting luminance signals and one of two chrominance component signals, said transmitting means comprising a switching system for alternating at said line frequency said chrominance signals and means for modulating thereby said subcarrier wave: a square wave generator controlled by said field frequency signals having a period equal to $2n$ times said field period, $n$ being an even integer; a gate alternately blocked and unblocked for $n$ consecutive field periods by said square wave generator; a phase inverter for inversing the phase of said subcarrier wave; and a multivibrator pulse generator for controlling said phase inverter, said multivibrator pulse generator being controlled by said field frequency signals through said gate.

7. A color television system comprising: generator means for generating a subcarrier wave, line frequency signals and field frequency signals; means for simultaneously transmitting a first video signal, and one of two other video signals, said transmitting means comprising a switching system for alternating at said line frequency said other two video signals and means for modulating thereby said subcarrier wave; first circuit means between said generator means and said switching system, for reversing the operation of said switch system at the beginning of each field only during equal sequences comprising an even number of fields, said sequences being separated by intervals comprising the same said number of fields.

References Cited in the file of this patent

UNITED STATES PATENTS 2,831,916 Dome ----------------- Apr. 22, 1958